United States Patent
Lyubarsky (10) Patent No.: US 11,327,328 B2
(45) Date of Patent: May 10, 2022

(54) BEAM SPREADER

(71) Applicant: Texas Instruments Incorporated, Dallas, TX (US)

(72) Inventor: Alexander Lyubarsky, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 416 days.

(21) Appl. No.: 16/205,811

(22) Filed: Nov. 30, 2018

(65) Prior Publication Data

US 2020/0174266 A1 Jun. 4, 2020

(51) Int. Cl.
G02B 27/14 (2006.01)
G02B 27/10 (2006.01)
G03B 21/20 (2006.01)

(52) U.S. Cl.
CPC ......... G02B 27/145 (2013.01); G02B 27/106 (2013.01); G02B 27/144 (2013.01); G03B 21/2033 (2013.01); G03B 21/2066 (2013.01)

(58) Field of Classification Search
CPC .. G02B 27/145; G02B 27/106; G02B 27/144; G03B 21/2033; G03B 21/2066
USPC ........................................................ 359/629
See application file for complete search history.

(56) References Cited

U.S. PATENT DOCUMENTS

| | | | | |
|---|---|---|---|---|
| 2005/0111072 A1* | 5/2005 | Miyagaki | ............... | G02F 1/1418 359/279 |
| 2009/0323193 A1* | 12/2009 | Miyajima | .......... | G02B 19/0014 359/636 |
| 2013/0121360 A1* | 5/2013 | Trela | ..................... | H01S 5/4087 372/50.11 |
| 2013/0321780 A1* | 12/2013 | Miura | .................... | G03B 21/14 353/94 |
| 2017/0288370 A1* | 10/2017 | Chen | .................... | G02B 27/106 |

* cited by examiner

*Primary Examiner* — James R Greece
(74) *Attorney, Agent, or Firm* — Michelle F. Murray; Charles A. Brill; Frank D. Cimino (57) ABSTRACT

Described examples include a beam spreader having a first beam splitter arranged to receive light from a light source, the first beam splitter arranged to pass a first portion of the light in a first direction and reflect a second portion of the light; a second beam splitter arranged to receive the second portion of the light and reflect a third portion of the light in a second direction parallel to the first direction and arranged to pass a fourth portion of the light; and a mirror arranged to receive the fourth portion of the light and reflect the fourth portion of the light in a third direction parallel to the first direction, wherein the third portion and the fourth portion of the light reflected from the mirror is separated from the first portion of the light in the spreading direction.

20 Claims, 10 Drawing Sheets

BEAM SPREADER

TECHNICAL FIELD

This relates generally to light sources, and more particularly to correcting irregularities in light provided by light sources.

BACKGROUND

Projectors and other display devices need at least one source of light to operate. One type of light source is the laser diode. Laser diodes provide compact, high-intensity lighting, which is particularly useful in the ultra-small projectors known as pico-projectors. However, laser diodes and some other types of light sources suffer from irregularities in light output. For example, the output light of some laser diodes diverges faster in one axis direction (fast axis) than another direction (slow axis). This creates an oval-shaped light profile. Some projectors modulate light from the light source(s) using one or more spatial light modulators. Receiving optics homogenize and focus the light onto the spatial light modulator. Maximum light throughput occurs when the etendue of the light source matches the etendue of the light receiving optics. However, most receiving optics have a round etendue. Cylindrical lenses, anamorphic prism pairs and tapered light tunnels may be used to correct the etendue mismatch between the light source and the receiving optics, but these devices can be large and expensive.

SUMMARY

In accordance with an example, a beam spreader includes a first beam splitter arranged to receive light from a light source, the first beam splitter arranged to pass a first portion of the light in a first direction and reflect a second portion of the light. The beam spreader including a second beam splitter arranged to receive the second portion of the light and reflect a third portion of the light in a second direction parallel to a the first direction and arranged to pass a fourth portion of the light, wherein the third portion of the light reflected from the second beam splitter is separated from the first portion of the light in a spreading direction. The beam spreader including a mirror arranged to receive the fourth portion of the light and reflect the fourth portion of the light in a third direction parallel to the first direction, wherein the fourth portion of the light reflected from the mirror is separated from the first portion of the light in the spreading direction.

DETAILED DESCRIPTION

Corresponding numerals and symbols in the different figures generally refer to corresponding parts unless otherwise indicated. The figures are not necessarily drawn to scale.

The term "coupled" may include connections made with intervening elements, and additional elements and various connections may exist between any elements that are "coupled."

In described examples, the problem of matching light from an illumination system with a spatial light modulator in a projector is solved by providing a beam spreader that has a first a first beam splitter arranged to receive light from a light source, the first beam splitter passing a first portion of the light and reflecting a second portion of the light. The beam spreader also includes a second beam splitter arranged to receive the second portion of the light and reflect a third portion of the light in a first direction parallel to a second direction of the first portion of the light and passing a fourth portion of the light. The third portion of the light reflected from the second beam splitter is separated from the first portion of the light in a spreading direction. The beam spreader includes a mirror arranged to receive the fourth portion of the light and reflect the fourth portion of the light in a third direction parallel to the second direction of the first portion of the light. The fourth portion of the light reflected from the mirror is separated from the first portion of the light in the spreading direction.

Figure 1A:
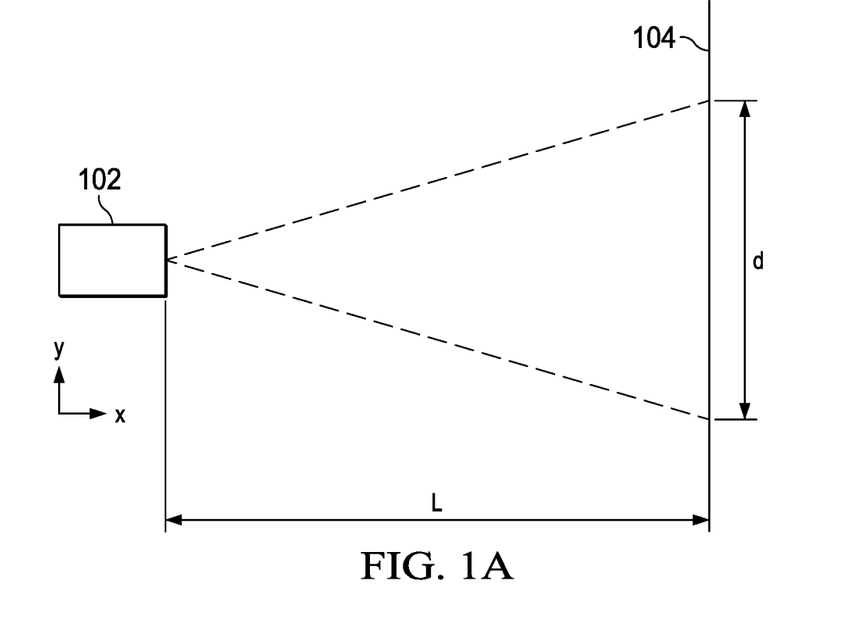
FIGS. 1A and 1B (collectively "FIG. 1") are diagrams showing spreading of light from a light source on fast and slow axes.
Figure 1B:
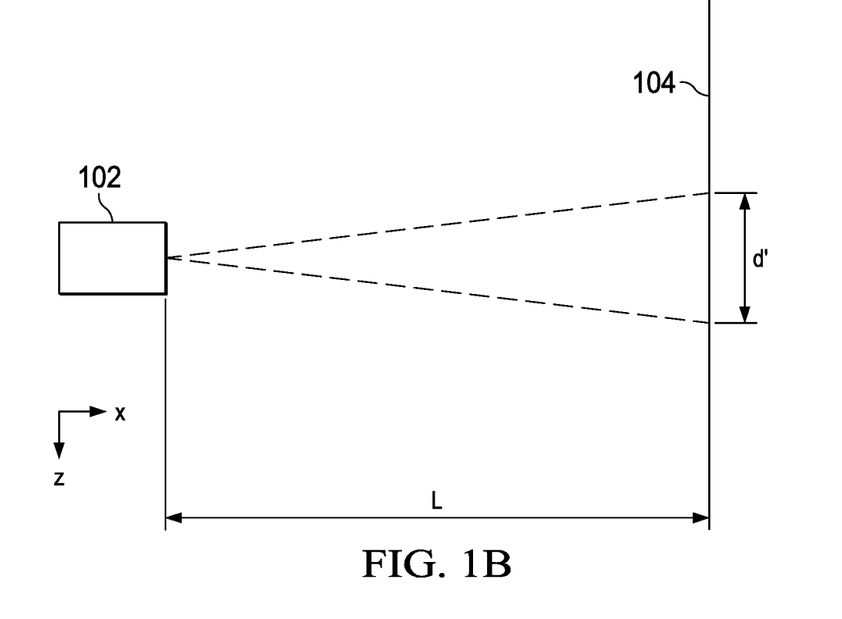

FIG. 1A shows spreading of light from a light source on a fast axis. On a fast axis, light from a source spreads faster than in the slow axis. The fast and slow axes are typically orthogonal to each other. Light source 102 projecting onto target 104 that is a distance L from light source 102. In this example, light source 102 is a laser diode light source. At target 104, the light from light source 102 spreads a distance d. FIG. 1B shows spreading of light from the light source on a slow axis. FIG. 1B shows light source 102 and target 104 from a perspective looking down from the top of the page of FIG. 1A. As used herein, "top," "bottom," "vertical," "horizontal," "up" and "down" indicate relationships in the illustration and do not indicate any other relationship. In this example, the slow axis is orthogonal to the fast axis illustrated in FIG. 1A. This is shown in FIG. 1B as, for the given distance L to target 104, light from light source 102 only spreads a distance d' that is smaller than d in FIG. 1A.

Figure 2:
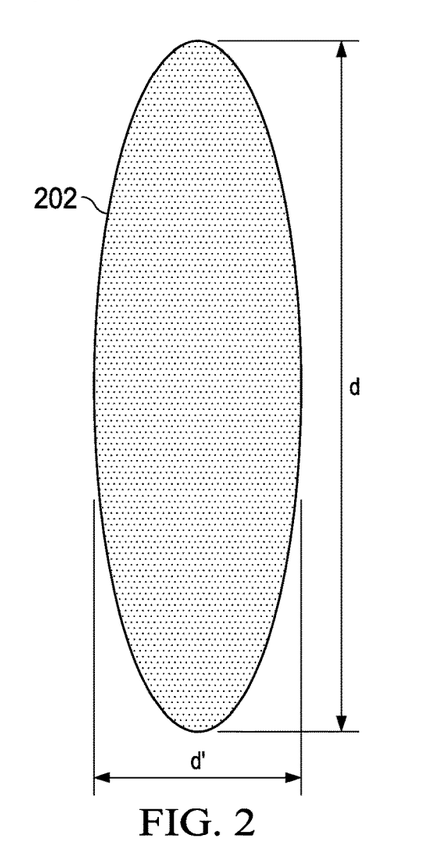
FIG. 2 is a diagram illustrating the pattern of the light projected by a light source at a target.

FIG. 2 illustrates the pattern or distribution of the light emitted by light source 102 incident on target 104 (FIG. 1). Light pattern 202 has a height d (FIG. 1A) in the vertical direction and a width d' (FIG. 1B) in the horizontal direction. As explained further herein below, this pattern can create problems when using light source 102 (FIG. 1) for illumination of a spatial light modulator or another function where a uniform light source is desired.

Figure 3:
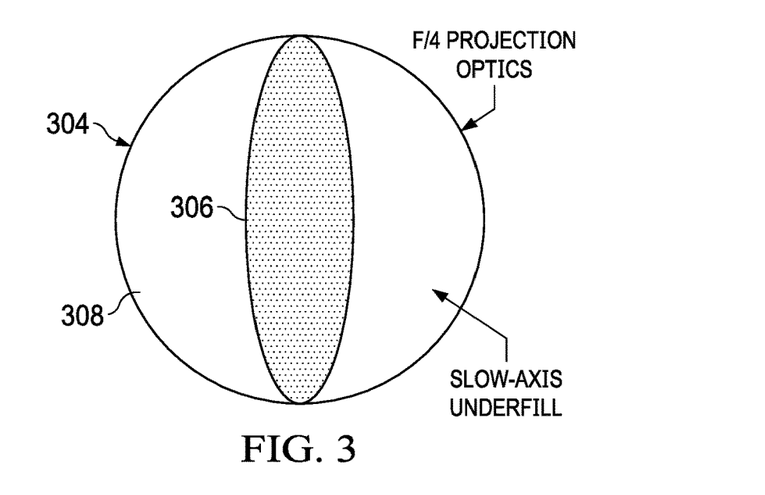
FIG. 3 is a diagram showing a light pattern on a light stop.

FIG. 3 shows a light pattern 306 like light pattern 202 (FIG. 2) on a pupil 304. Pupil 304 represents that area where the projection optics (not shown) receive light. Light pattern 306 is positioned so that all the light of light pattern 306 is within pupil 304. In this example, pupil 304 is part of projection optics having an F/4 configuration as an example. For projection, it is desirable to use the lowest number F stop as possible for maximum light throughput. However, below F/4, the necessary lenses and other components become large and expensive. Therefore, this example uses F/4 to provide a compromise between light throughput and the cost and size of components. As shown in FIG. 3, light pattern 306 does not fill pupil 304 and thus creates pupil underfill 308.

Light pattern 306 is sometimes called the output etendue of the light source. Pupil 304 is the etendue of the illuminated device; for example, a spatial light modulator. The most efficient light transfer occurs when the output etendue and the input etendue match. It is clear from FIG. 3 that light pattern 306 and pupil 304 do not match. Stated in another way, if the etendue of the fast axis matches the etendue (pupil) of the projection optics, the etendue of the slow axis does not match the etendue of the projection optics.

Figure 4:
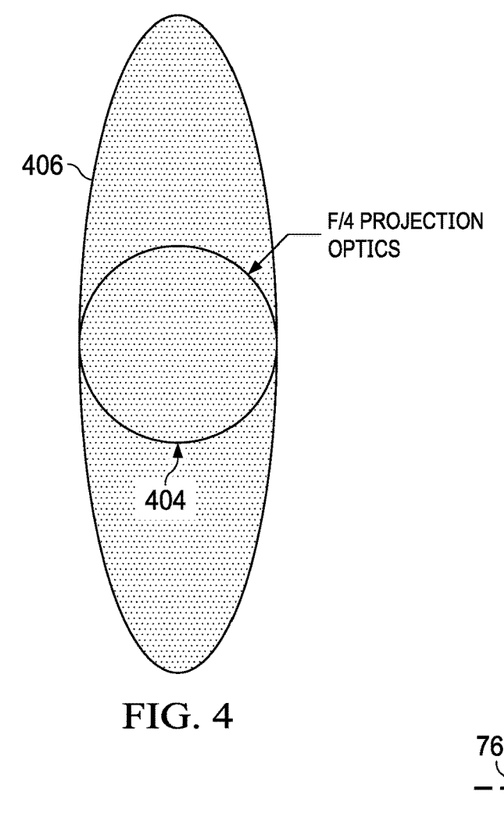
FIG. 4 is another diagram showing a light pattern on a light stop.

FIG. 4 shows a light pattern 406 like light pattern 306 of FIG. 3 at pupil 404. Pupil 404 is like pupil 304. In FIG. 4, light pattern 406 fills pupil 404 symmetrically. The etendue of the fast axis and slow axis matches the etendue (pupil) of the projection optics. This removes the pupil underfill of FIG. 3. However, in this configuration most of light pattern 306 is outside pupil 404. The light that is outside pupil 404 is wasted. Therefore, the configuration of FIG. 4 is not a viable solution to pupil underfill.

Figure 5:
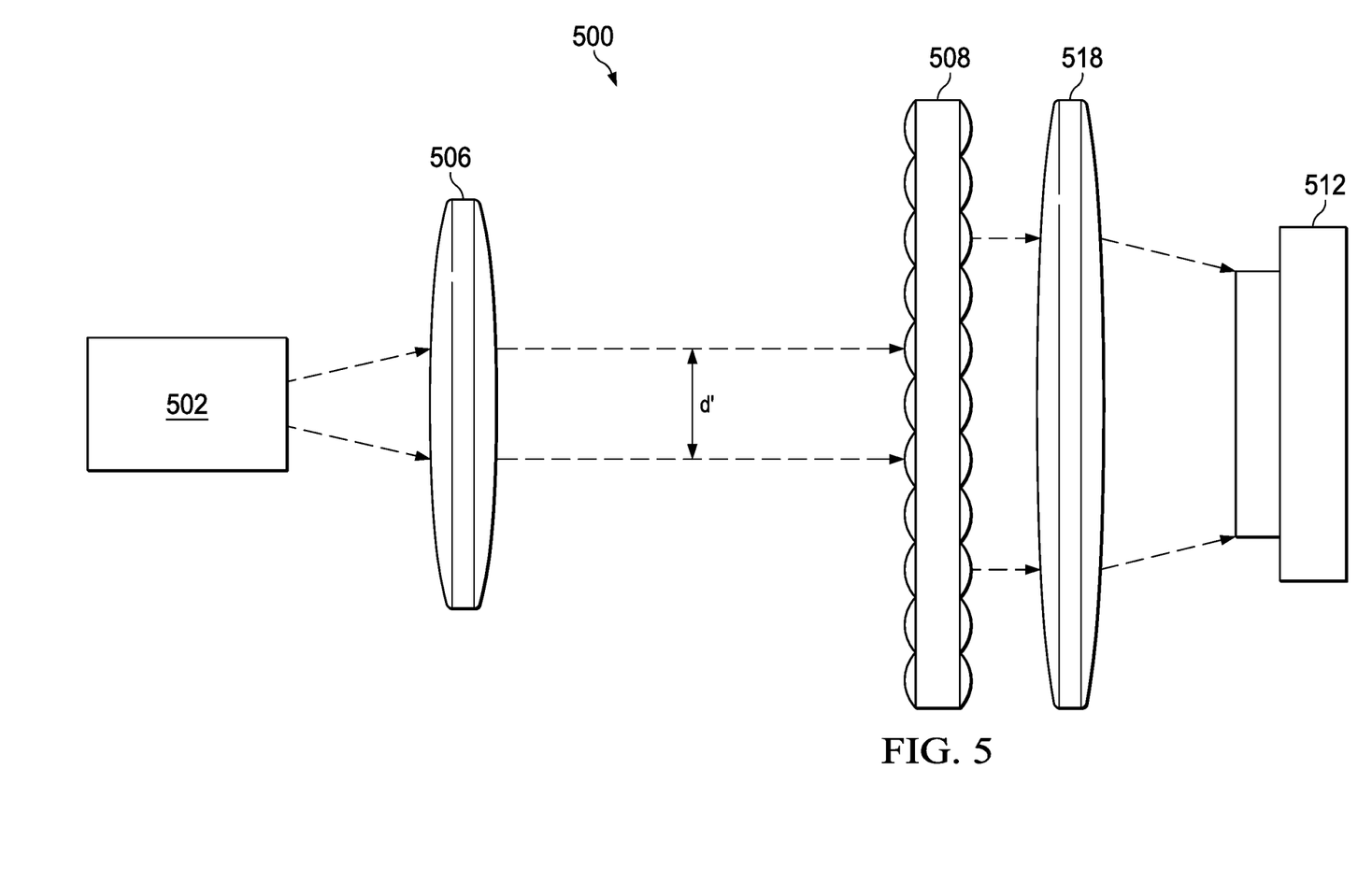
FIG. 5 is a diagram showing an example spatial light modulator illuminator.

FIG. 5 shows an example spatial light modulator illuminator 500. Light source 502 is a laser diode light source in this example. Lens 506 collimates the light from light source 502. As used herein, a "lens" may be a single lens or may be combination of multiple lenses. The width of the light exiting lens 506 is d,' indicating that the view of FIG. 5 is of the slow-axis of light source 502. The light passes to microlens array 508. Lens 518 focuses the light output of microlens array 508 onto spatial light modulator 512. In this example, spatial light modulator is a digital micromirror device (DMD) or a liquid crystal on silicon (LCOS) device. The purpose of microlens array 508 is to mix or homogenize the non-uniform light provided by light source 502 so that it uniformly illuminates spatial light modulator 512. However, as illustrated in FIG. 5, because of the narrow dimension d,' the light only impacts two or three lenslets of microlens array 508 in this dimension. This small number of lenslets provides poor mixing of the light.

Figure 6:
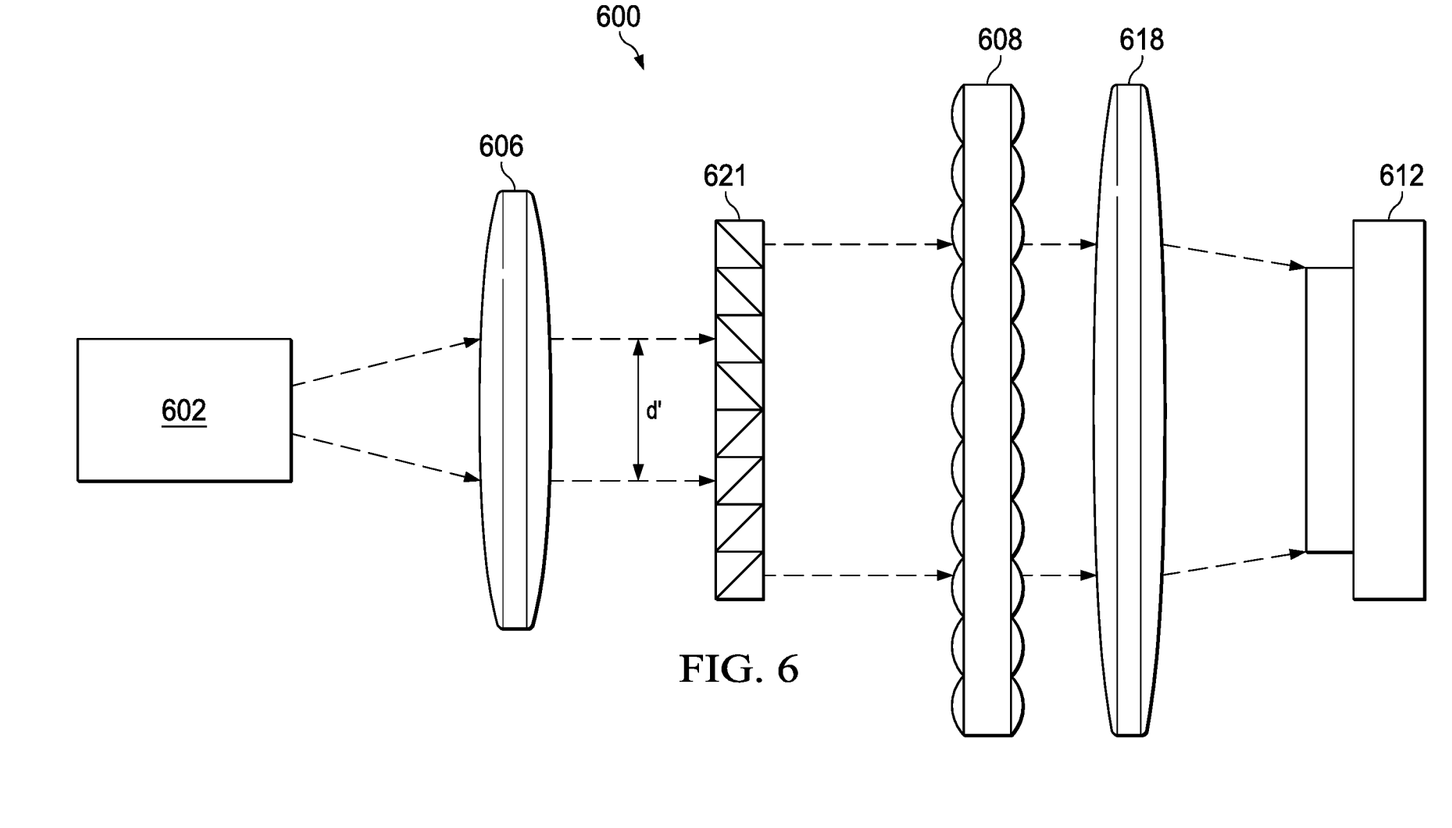
FIG. 6 is a diagram showing another example spatial light modulator illuminator.

FIG. 6 shows an example spatial light modulator illuminator 600. In this example, light source 602 is a laser diode. Lens 606 collimates the light output of light source 602. As indicated by the dimension d,' the view of FIG. 6 is of the slow-axis of the light from light source 602. After collimation by lens 606, beam spreader 621 spreads the light in this dimension. Beam spreader 621 is located at the pupil. The operation of beam spreader 621 is more fully explained hereinbelow. The spread light passes to microlens array 608. More lenslets provide improved homogenization of the light because of the spread beam. Lens 618 focuses the homogenized light onto spatial light modulator 612. In this example, spatial light modulator 612 is a DMD or LCOS device. Spatial light modulator 612 modulates the light to a desired image.

Figure 7:
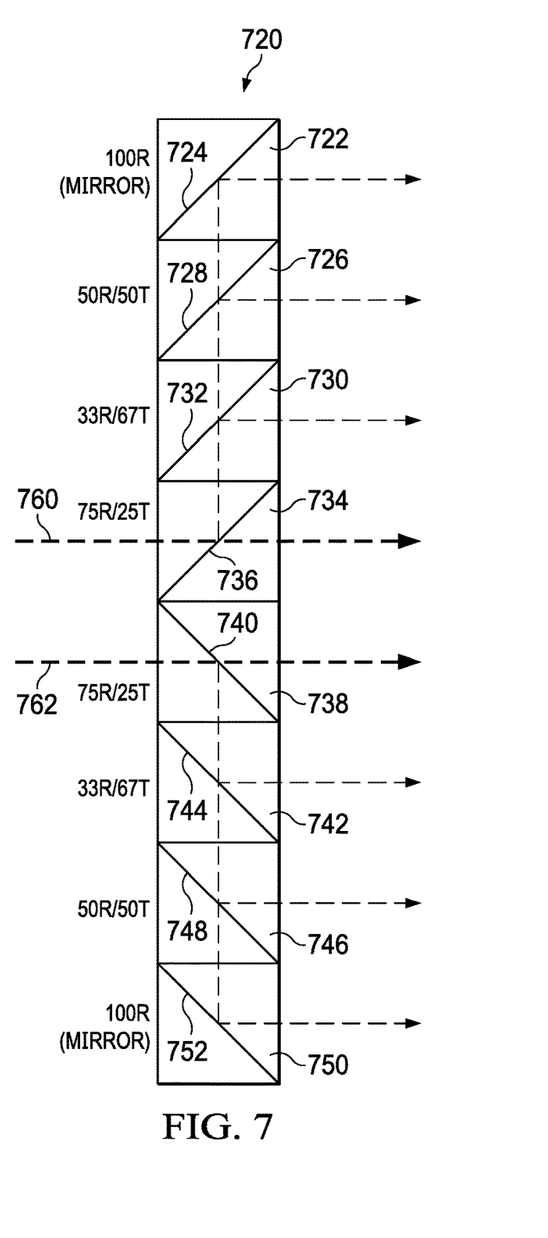
FIG. 7 is a diagram showing an example beam spreader.

FIG. 7 shows an example beam spreader 720. Beam spreader 720 is like beam spreader 621 (FIG. 6). Light 760 and 762 enters beam spreader 720. Light 760 is spread by the upper portion of beam spreader 720, which includes beam splitter 722, beam splitter 726, beam splitter 730 and beam splitter 734. Beam splitters are commercially available from, for example, Thorlabs, Inc. In this example, beam spreader 720 is a monolithic beam spreader as opposed to a combination of off-the-shelf beam splitters. The beam splitters in this example have a coated interface that reflects part of the beam and transmits the remaining part of the beam. For example, beam splitter 734 includes layer 736 that transmits 25% (25T) of light 760 and reflects 75% (75R) of light 760. Because layer 736 is at a 45° angle, the reflected portion of light 760 reflects at a 90° angle from the incoming beam in the spreading direction into beam splitter 730. Layer 732 of beam splitter 730 has a 33R/67T split in this example. Therefore, 33% of the 75% of light 760 that was reflected by beam splitter 734 reflects off layer 732. This reflected light passes on (for example, to a microlens array like microlens array 608 (FIG. 6)). The intensity of this portion of the light is 0.33×0.75=25% of the incoming light as indicated in FIG. 7. In addition, this portion of the light shifts upward (relative to the page) in a spreading direction by the distance from layer 736 to layer 732. Thus, this portion of the beam is spread in the spreading direction from the portion of the beam transmitted through beam splitter 734. Similarly, layer 728 of beam splitter 726 reflects a portion of the light transmitted from beam splitter 730 and transmits a portion to beam splitter 722. Layer 724 of beam splitter 722 is a mirror that reflects 100% of the remaining light. This example results in a uniform output of light. The reflection/transmission ratios of the beam splitters may be selected to achieve any desired distribution of the light. In other examples, the layers may have coatings to produce rectangular, Gaussian, or custom reflection/transmission intensity profiles. In addition, beam spreader 720 includes two beam splitters (beam splitter 730 and beam splitter 726) between beam splitter 734 and beam splitter 722 (the first and last beam splitters, respectively). The use of two intermediate beam splitters is for ease of explanation. Any number of beam splitters may be used according to the distance that the light is to be spread and chosen granularity (beam splitter size) of the spread light. As with the upper portion of beam spreader 720, in the lower portion, layer 740 of beam splitter 738, layer 744 of beam splitter 742, layer 748 of beam splitter 746 and layer 752 of beam splitter 750 spread light 762 in a downward vertical spreading direction (relative to the page).

Figure 8:
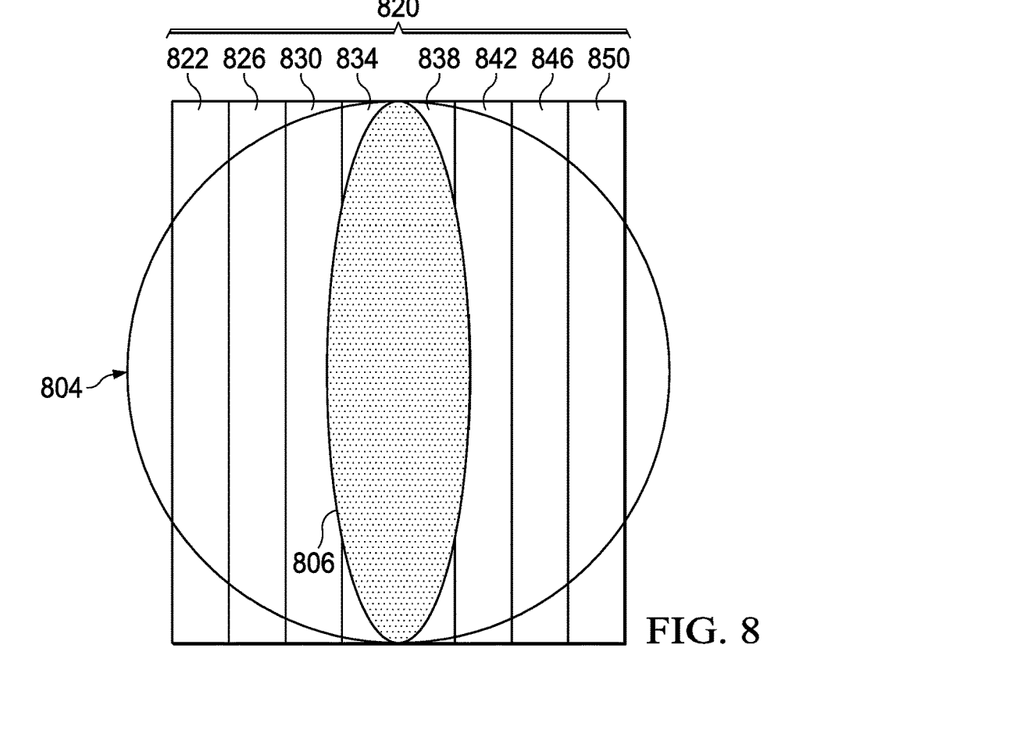
FIG. 8 is a diagram showing an example beam spreader from the perspective of the light source.

FIG. 8 shows an example beam spreader 820 from the perspective of the light source. Components in FIG. 8 with corresponding numbers perform like functions to the corresponding components of FIG. 7. For example, beam spreader 820, beam splitter 822, beam splitter 826, beam splitter 830, beam splitter 834, beam splitter 838, beam splitter 842, beam splitter 846 and beam splitter 850 correspond to beam spreader 720, beam splitter 722, beam splitter 726, beam splitter 730, beam splitter 734, beam splitter 738, beam splitter 742, beam splitter 746 and beam splitter 750. Light pattern 806 is provided by a light source like light source 602 and has an oval pattern caused by the fast-axis and slow-axis spreading as discussed hereinabove. In this example, approximately half of the light from light pattern 806 enters beam splitter 834 and is spread by beam splitters 834, 830, 826 and 822 in the manner discussed hereinabove regarding beam splitters 734, 730, 726 and 722, respectively. Similarly, approximately the other half of the light from light pattern 806 enters beam splitter 838 and is spread by beam splitters 838, 842, 846 and 850 in the manner discussed hereinabove regarding beam splitters 738, 742, 746 and 750, respectively. Thus, beam spreader 820 spreads the light from light pattern 806 to cover most of pupil 804.

Figure 9:
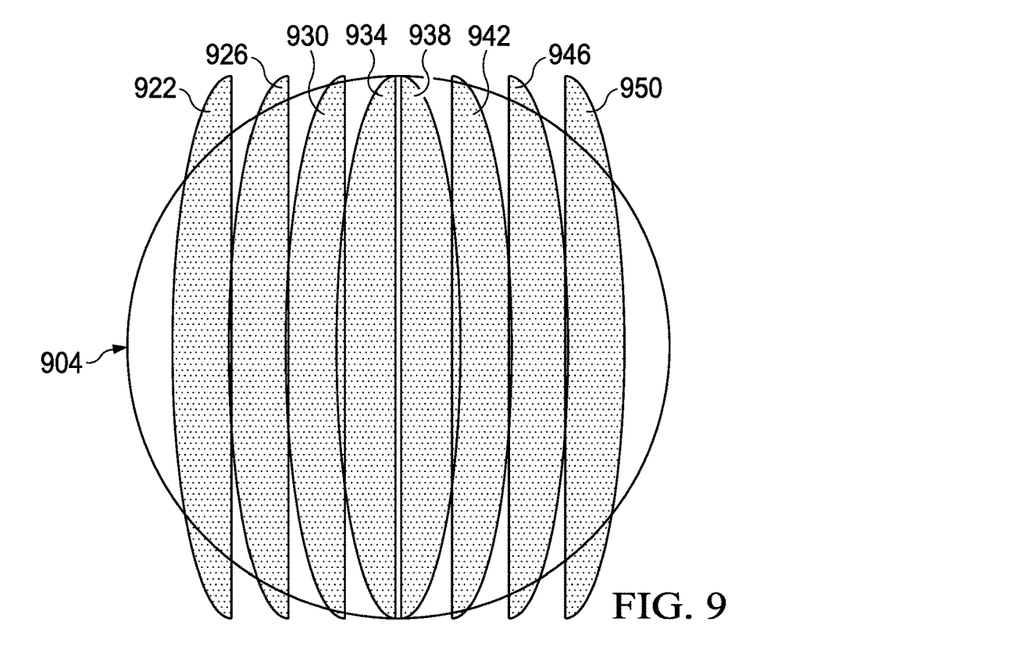
FIG. 9 is a diagram showing the output of an example beam spreader.

FIG. 9 shows the output of an example beam spreader like beam spreader 820 (FIG. 8). The output of beam splitter 822 (FIG. 8) is approximately pattern 922. The output of beam splitter 826 (FIG. 8) is approximately pattern 926. The output of beam splitter 830 (FIG. 8) is approximately pattern 930. The output of beam splitter 834 (FIG. 8) is approximately pattern 934. The output of beam splitter 838 (FIG. 8) is approximately pattern 938. The output of beam splitter 842 (FIG. 8) is approximately pattern 942. The output of beam splitter 846 (FIG. 8) is approximately pattern 946. The output of beam splitter 850 (FIG. 8) is approximately pattern 950. Patterns 922, 926, 930, 934, 938, 942, 946 and 950 cover most of pupil 904, and thus a beam spreader like beam spreader (820 FIG. 8) corrects for the narrow coverage of the slow-axis light pattern while only occupying one beam splitter thickness in the direction of the light travel. The example of beam splitter 820 (FIG. 8) provides an inexpensive and compact correction for a narrow light pattern provided by some light sources.

Figure 10:
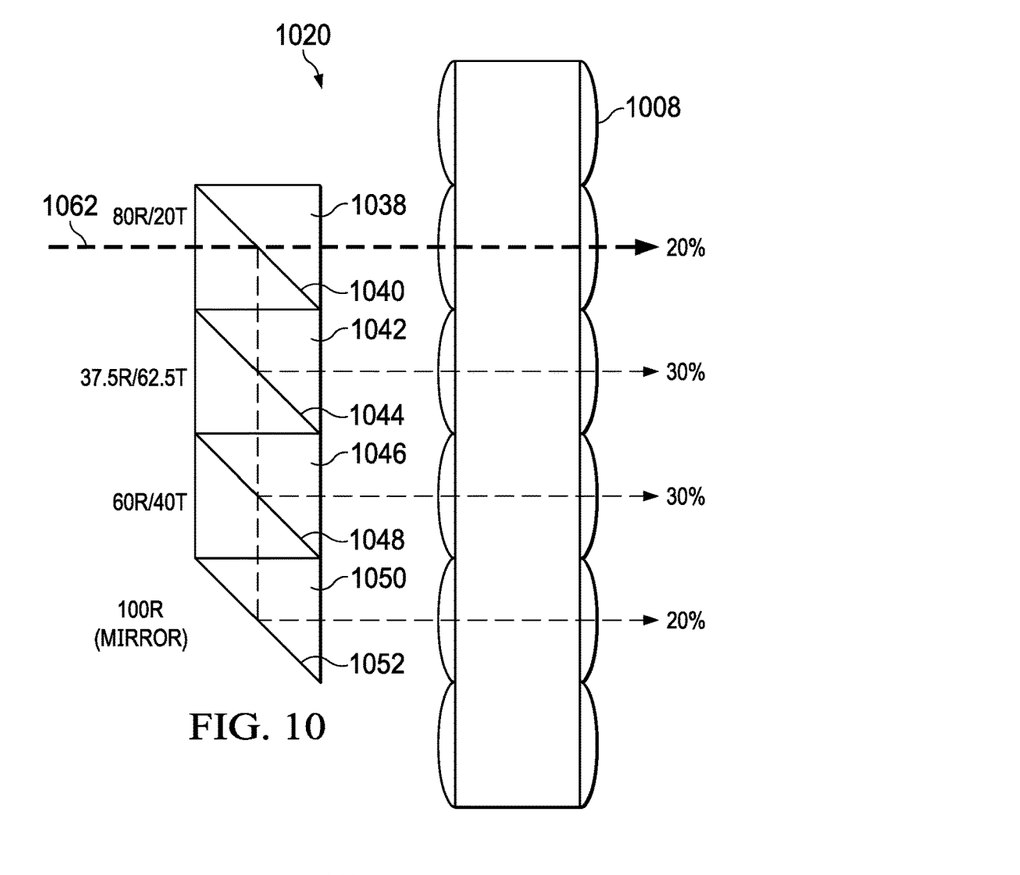
FIG. 10 is a diagram showing another example beam spreader.

FIG. 10 shows another example beam spreader. Beam spreader 1020 includes beam splitters 1038, 1042, 1046 and 1050 having layers 1040, 1044, 1048 and 1052, respectively. With beam spreader 1020, light 1062 enters beam splitter 1038, which partially transmits the light and partially reflects the light to beam splitter 1042; which partially reflects the light for transmission and partially passes the light to beam splitter 1046; which partially reflects the light for transmission and partially passes the light to beam splitter 1050; which reflects the remaining light for transmission. Thus, the light is spread over multiple lenslets of microlens array 1008. Thus, beam spreader 1020 spreads the light in one spreading direction, as opposed to beam spreader 820 that spreads the light in two spreading directions.

Figure 11:
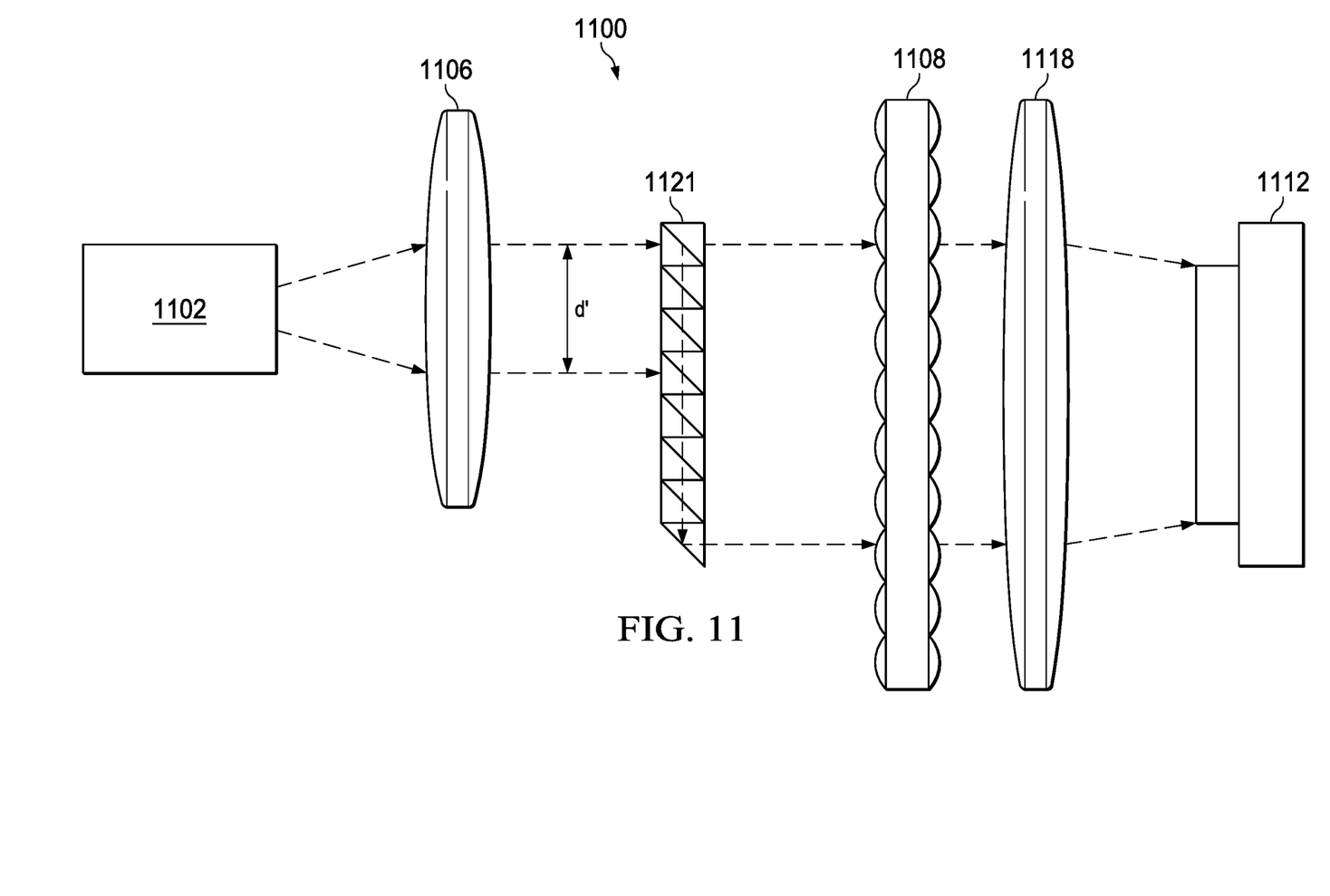
FIG. 11 is a diagram showing another example spatial light modulator illuminator.

FIG. 11 shows an example spatial light modulator illuminator 1100 using a beam spreader like beam spreader 1020 (FIG. 10). Lens 1106 collimates light from light source 1102, which is provided to one end of beam spreader 1121. Beam spreader 1121 is like beam spreader 1020 (FIG. 10). FIG. 11 is a view of the slow-axis direction of the light as indicated by the width d' of the light. Beam spreader 1121 spreads the light in one beam spreading direction across the pupil (not shown) The output spread light from beam spreader 1121 is homogenized by microlens array 1108 and focused onto spatial light modulator 1112 by lens 1118.

Figure 12:
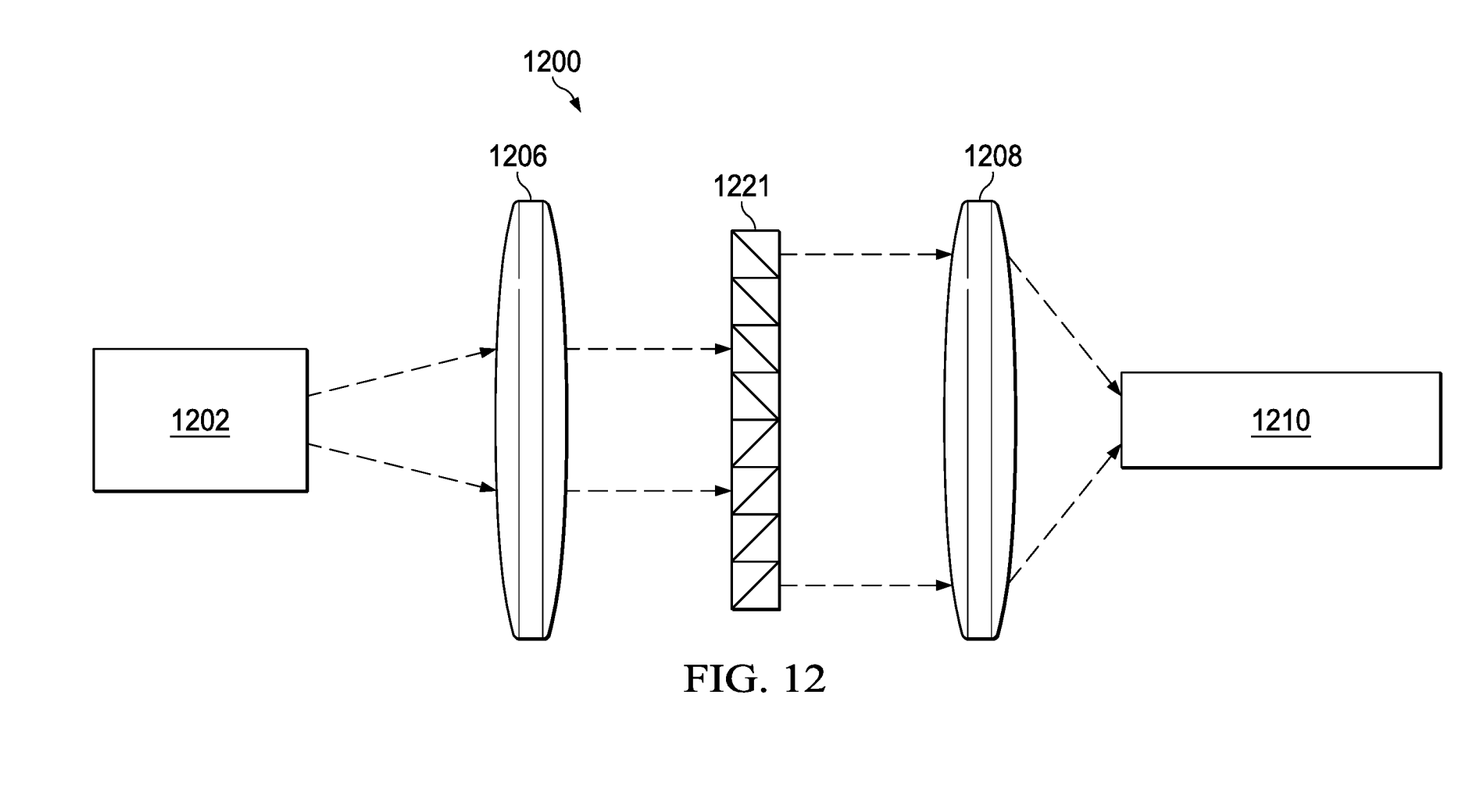
FIG. 12 is a diagram showing another example spatial light modulator illuminator.

FIG. 12 shows an example spatial light modulator illuminator 1200 using a beam spreader like beam spreader 621 (FIG. 6). In this example, light source 1202 is a laser diode. The view of FIG. 12 shows the slow-axis. Lens 1206 collimates the light from light source 1202. The collimated light is spread by beam spreader 1221 at the pupil location. Lens 1208 focuses the light onto the entrance of light tunnel 1210, which homogenizes the light. The homogenized light exiting light tunnel 1210 is provided to a spatial light modulator (not shown) via focusing optics (not shown). Lens 1208 is configured so that all or nearly all the fast-axis of the light image (see FIG. 2) enters light tunnel. This means that the slow-axis of the light image would cover a relatively small part of the opening of light tunnel 1210, which would have a negative impact on the homogenization provided by light tunnel 1210. In a light tunnel, the slow axis has a small angular divergence which requires a very long tunnel or very wide tapering which may not only lower efficiency but increase size of the system. Using beam spreader 1221 avoids these negative impacts.

Figure 13:
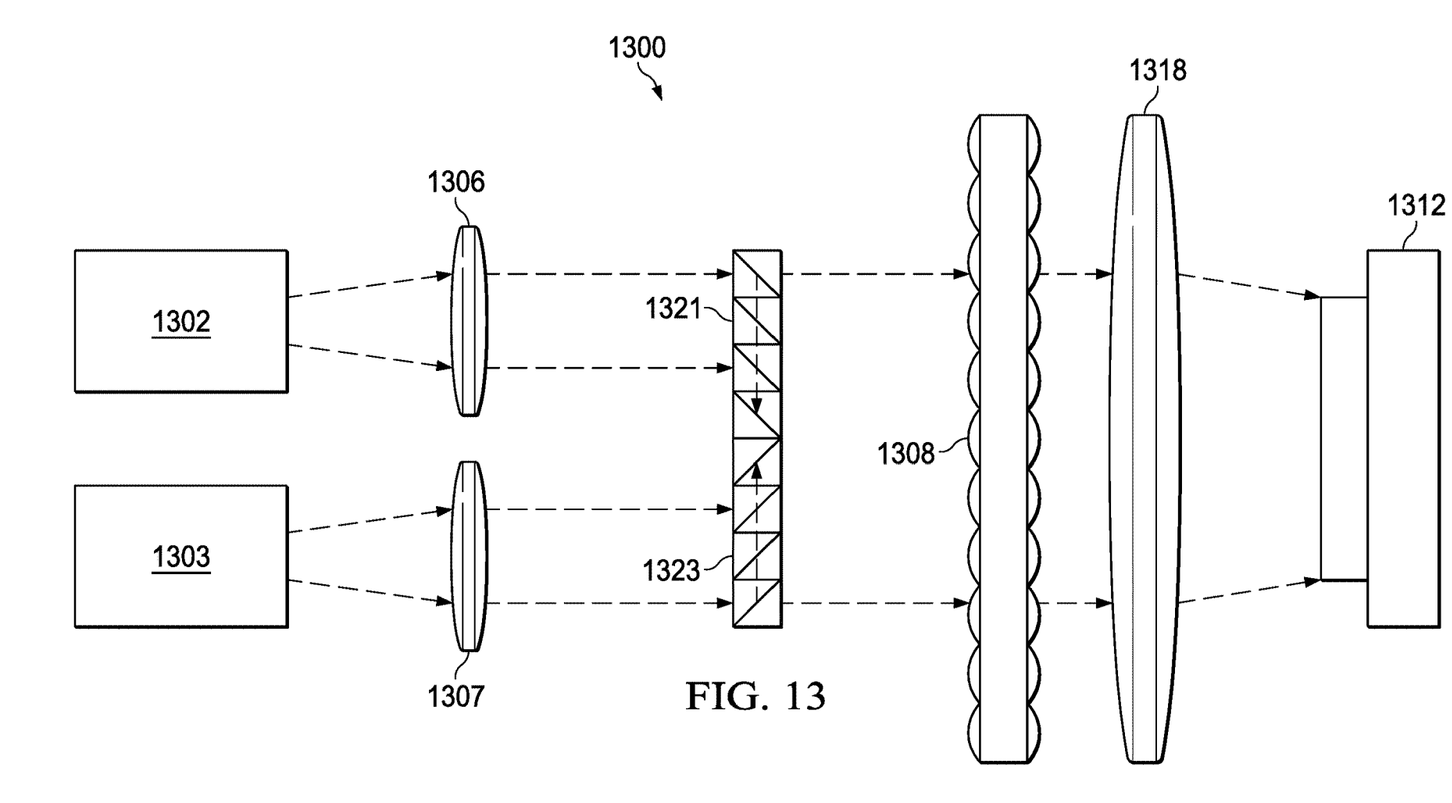
FIG. 13 shows another example spatial light modulator illuminator.

FIG. 13 shows another example spatial light modulator illuminator 1300. In this example, light source 1302 and light source 1303 are laser diodes. Lenses 1306 and 1307 collimate the light provided by light source 1302 and light source 1303. The collimated light from light source 1302 is directed to the upper portion (as shown in FIG. 13) of beam spreader 1321. The collimated light from light source 1303 is directed to the lower portion (as shown in FIG. 13) of beam spreader 1323. Beam spreader 1321 spreads the collimated light from light source 1302 in a downward beam spreading direction (relative to the page) and beam spreader 1323 spreads the collimated light from light source 1303 in an upward beam spreading direction (relative to the page). Thus, beam spreaders 1321 and 1323 spread the narrow portions of the collimated light from light sources 1302 and 1303 toward each other to provide a wide light image through the pupil location. This combined light image is then homogenized by microlens array 1308 and focused by lens 1318 onto spatial light modulator 1312. The combined light in this example includes the light from two laser diodes and thus provides nearly twice the brightness of a system using one laser diode. In this example, spatial light modulator 1312 is a DMD or LCOS device.

Figure 14:
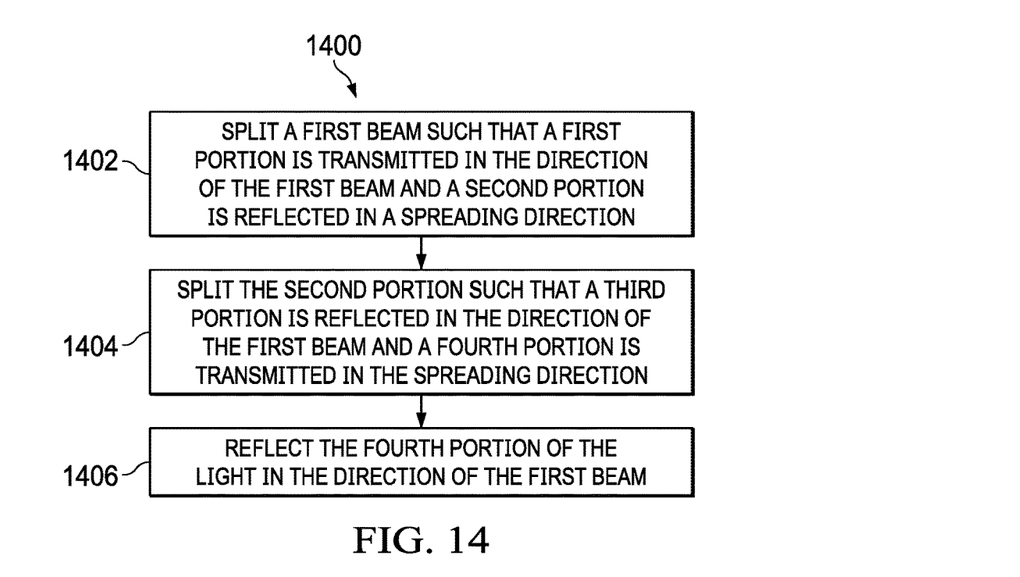
FIG. 14 is a flow diagram of an example method.

FIG. 14 is a flow diagram of an example method 1400. In step 1402, a first beam is split using a beam splitter such as beam splitter 1038 (FIG. 10) such that a first portion of the light is transmitted in a direction of the first beam and a second portion is reflected in a spreading direction. In step 1404, the second portion is split using one or more splitters such as splitters 1042 and 1046 (FIG. 10) such that a third portion of the light is reflected in same the direction as the first beam and a fourth portion of the light is transmitted in the spreading direction. In step 1406, the fourth portion of the light is reflected in the direction of the first beam using a mirror such as layer 1052 of beam splitter 1050 (FIG. 10).

Modifications are possible in the described examples, and other examples are possible, within the scope of the claims.

What is claimed is:

1. A beam spreader comprising:
   a first beam splitter configured to receive light from a light source, the first beam splitter configured to transmit a first portion of the light in a first direction and reflect a second portion of the light, wherein the first portion of the light is a first percent of the received light;
   a second beam splitter configured to:
      receive the second portion of the light;
      reflect a third portion of the second portion of the light in a second direction, wherein the third portion is a second percent of the received light, and the second percent is the same as the first percent; and
      transmit a fourth portion of the second portion of the light, wherein the third portion of the light reflected from the second beam splitter is offset from the first portion of the light in a spreading direction; and
   a mirror configured to receive the fourth portion of the light and reflect the fourth portion of the light in a third direction, wherein the fourth portion of the light reflected from the mirror is offset from the first portion of the light in the spreading direction.

2. The beam spreader of claim 1, wherein the second beam splitter comprises at least two beam splitters.

3. The beam spreader of claim 1, wherein the light source is a laser diode.

4. The beam spreader of claim 1, wherein the first beam splitter comprises a light splitting layer having a forty-five-degree angle relative to the light.

5. The beam spreader of claim 1, wherein the light source has a fast axis and a slow axis.

6. The beam spreader of claim 5, wherein the spreading direction is the slow axis.

7. A system comprising:
a light source configured to produce light;
a monolithic beam spreader optically coupled to the light source, the monolithic beam spreader comprising:
  a first beam splitter configured to receive the light from the light source, the first beam splitter configured to transmit a first portion of the light in a first direction and reflect a second portion of the light;
  a second beam splitter configured to:
    receive the second portion of the light;
    reflect a third portion of the second portion of the light in a second direction; and
    transmit a fourth portion of the second portion of the light, wherein the third portion of the light is offset from the first portion of the light in a spreading direction; and
  a mirror configured to receive the fourth portion of the light and reflect the fourth portion of the light in a third direction, wherein the fourth portion of the light is offset from the first portion of the light in the spreading direction; and
a spatial light modulator optically coupled to the monolithic beam spreader, the spatial light modulator configured to receive the first portion of the light, the third portion of the light, and the fourth portion of the light.

8. The system of claim 7, wherein the second beam splitter comprises at least two beam splitters.

9. The system of claim 7, wherein the spatial light modulator comprises a digital micromirror device or a liquid crystal on silicon device.

10. The system of claim 7, wherein the first beam splitter comprises a light splitting layer having a forty-five-degree angle relative to the light from the light source.

11. The system of claim 7, wherein the light source has a fast axis and a slow axis.

12. The system of claim 11, wherein the spreading direction is the slow axis.

13. The system of claim 7, wherein the monolithic beam spreader comprises a first portion and a second portion, and the spreading direction is a first spreading direction, the first portion of the monolithic beam spreader configured to receive a first section of the light from the light source, and the second portion of the monolithic beam spreader configured to receive a second section of the light from the light source, the second beam spreader configured to spread the second section of the light from the light source in a second spreading direction.

14. The system of claim 7, wherein the monolithic beam spreader comprises a first portion and a second portion, the light source is a first light source, the light is first light, and the spreading direction is a first spreading direction, and the system further comprising:
a second light source configured to produce second light; and
the first portion of the monolithic beam spreader configured to receive the first light from the first light source, and the second portion of the monolithic beam spreader configured to receive the second light from the second light source, the second portion of the monolithic beam spreader configured to spread the second light from the second light source in a second spreading direction.

15. A monolithic beam spreader comprising:
a first beam splitter configured to receive light, the light having a slow axis and a fast axis, the first beam splitter configured to transmit a first portion of the light in a first direction and reflect a second portion of the light;
a second beam splitter configured to:
  receive the second portion of the light;
  reflect a third portion of the second portion of the light in a second direction; and
  transmit a fourth portion of the second portion of the light, wherein the fourth portion is offset from the first portion in a spreading direction, and the spreading direction is along the slow axis; and
a mirror configured to receive the fourth portion of the light and reflect the fourth portion of the light in a third direction.

16. The monolithic beam spreader of claim 15, wherein the fourth portion of the light reflected from the mirror is separated from the first portion of the light in the spreading direction.

17. The monolithic beam spreader of claim 15, wherein the first beam splitter has a first reflectivity, the second beam splitter has a second reflectivity, and the second reflectivity is different from the first reflectivity.

18. The monolithic beam spreader of claim 17, wherein the first reflectivity is greater than the second reflectivity.

19. The monolithic beam spreader of claim 15, wherein the first beam splitter comprises a coated interface.

20. The system of claim 7, wherein the first portion of the light is a fixed percent of the received light, the third portion of the light is the fixed percent of the received light, and the fourth portion of the light is the fixed percent of the light.

* * * * *